United States Patent
Ishikura et al.

(10) Patent No.: US 12,049,133 B2
(45) Date of Patent: Jul. 30, 2024

(54) PROPELLER SHAFT

(71) Applicant: Hitachi Astemo, Ltd., Hitachinaka (JP)

(72) Inventors: Kenichiro Ishikura, Hitachinaka (JP); Kenichi Sugiyama, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 421 days.

(21) Appl. No.: 17/433,852

(22) PCT Filed: Feb. 4, 2020

(86) PCT No.: PCT/JP2020/004100
§ 371 (c)(1),
(2) Date: Aug. 25, 2021

(87) PCT Pub. No.: WO2020/179318
PCT Pub. Date: Sep. 10, 2020

(65) Prior Publication Data
US 2022/0144081 A1    May 12, 2022

(30) Foreign Application Priority Data

Mar. 1, 2019   (JP) ................................. 2019-037166

(51) Int. Cl.
*B60K 17/22* (2006.01)
*F16D 3/226* (2006.01)
*F16D 3/227* (2006.01)

(52) U.S. Cl.
CPC .............. *B60K 17/22* (2013.01); *F16D 3/226* (2013.01); *F16D 3/227* (2013.01); F16D 2300/08 (2013.01); Y10S 464/906 (2013.01)

(58) Field of Classification Search
CPC ......... B60K 17/22; F16D 3/226; F16D 3/227; F16D 2300/08; Y10S 464/906
USPC .................................................. 464/146, 155
See application file for complete search history.

(56) References Cited

U.S. PATENT DOCUMENTS

| | | | |
|---|---|---|---|
| 6,379,255 B1 * | 4/2002 | Cermak | F16D 3/223 |
| 10,539,192 B2 * | 1/2020 | Gordon | F16D 3/221 |
| 2013/0252746 A1 | 9/2013 | Sugiyama et al. | |

FOREIGN PATENT DOCUMENTS

| | | | |
|---|---|---|---|
| JP | 53-123744 | * | 10/1978 |
| JP | 5872341 B2 | | 3/2016 |

OTHER PUBLICATIONS

International Search Report dated Mar. 17, 2020 issued in International Application No. PCT/JP2020/004100, with English translation, 5 pages.
Written Opinion of the International Searching Authority dated Mar. 17, 2020 issued in International Application No. PCT/JP2020/004100, with English translation, 7 pages.

* cited by examiner

*Primary Examiner* — Greg Binda
(74) *Attorney, Agent, or Firm* — FOLEY & LARDNER LLP

(57) ABSTRACT

A propeller shaft includes constant-velocity joints at both the end portions of a first shaft member.

8 Claims, 9 Drawing Sheets

PROPELLER SHAFT

TECHNICAL FIELD

The present invention relates to a propeller shaft.

BACKGROUND ART

Generally, a propeller shaft for an automobile is divided into two parts or three parts including a driving shaft connected to a transmission side and a driven shaft connected to a differential gear side with a joint mechanism such as a Cardan joint and a constant-velocity joint provided at the end portions of these divided shafts that face each other, and is also rotatably supported on a vehicle body floor via a support apparatus provided at an approximately axially central position.

Then, the propeller shaft is configured in such a manner that, at the coupling between the transmission and the driving shaft or the coupling between the differential gear and the driven shaft, an input shaft on the transmission side or an output shaft on the differential gear side is directly inserted and splined to an inner race member of the constant-velocity joint from the axial direction, as discussed in, for example, PTL 1.

CITATION LIST

Patent Literature

PTL 1: Japanese Patent No. 5872341

SUMMARY OF INVENTION

Technical Problem

However, the technique discussed in PTL 1 involves such a problem that, if the support apparatus at the central position of the propeller shaft is first fixedly attached to the vehicle when the propeller shaft is mounted onto the vehicle, the propeller shaft should be first compressed to spline the inner race member of the end portion of the propeller shaft and the input/output shaft on the vehicle side to each other, but the propeller shaft can be compressed only by a sliding movement amount corresponding to a length of one constant-velocity joint, thereby leading to unsatisfactory workability for the mounting onto the vehicle.

One of objects of the present invention is to provide a propeller shaft capable of considerably increasing the sliding movement amount.

Solution to Problem

According to one aspect of the present invention, a propeller shaft includes a first shaft member including a first end portion and a second end portion that are both end portions in a direction of a rotational axis of the first shaft member. The propeller shaft further includes a first constant-velocity joint. The first constant-velocity joint includes a first inner race member with a first female spline provided thereon, a first ball disposed on an outer periphery of the first inner race member in a radial direction with respect to the rotational axis, a first cage configured to hold the first ball on the first inner race member, and a first outer race member disposed on an outer periphery of the first ball in the radial direction. The first outer race member includes a first race groove in which the first ball is movable in the direction of the rotational axis, and is connected to the first end portion of the first shaft member. The propeller shaft further includes a second constant-velocity joint. The second constant-velocity joint includes a second inner race member including a second female spline provided thereon to which the second end portion of the first shaft member is splined, a second ball disposed on an outer periphery of the second inner race member in the radial direction with respect to the rotational axis, a second cage configured to hold the second ball on the second inner race member, and a second outer race member disposed on an outer periphery of the second ball in the radial direction and including a second race groove in which the second ball is movable in the direction of the rotational axis. The propeller shaft further includes a second shaft member supported on a centering bearing support fixed to the automobile and including one end portion splined to the first female spline. A distance by which the second ball is movable toward an edge portion of the second race groove is longer than a distance by which a bottom portion of the first outer race member is movable toward the first end portion of the first shaft member when the first shaft member is moved from the second end portion toward the first end portion in the direction of the rotational axis, and a distance by which the first ball is movable toward an edge portion of the first race groove is longer than a distance by which the second end portion is movable toward a bottom portion of the second outer race member when the first shaft member is moved from the first end portion toward the second end portion.

Advantageous Effects of Invention

Therefore, the propeller shaft according to the one aspect of the present invention includes the constant-velocity joints that are each axially slidably movable at both the ends, and can prevent damage from being inflicted on the balls and the stop rings along with significantly increasing the sliding movement amount by increasing the extension-side axial sliding movement length of the constant-velocity joint on the other end side compared to the compression-side axial sliding movement length of the constant-velocity joint on one end side, thereby enhancing the durability along with improving the workability of the mounting onto the vehicle.

DESCRIPTION OF EMBODIMENTS

First Embodiment

Figure 1:
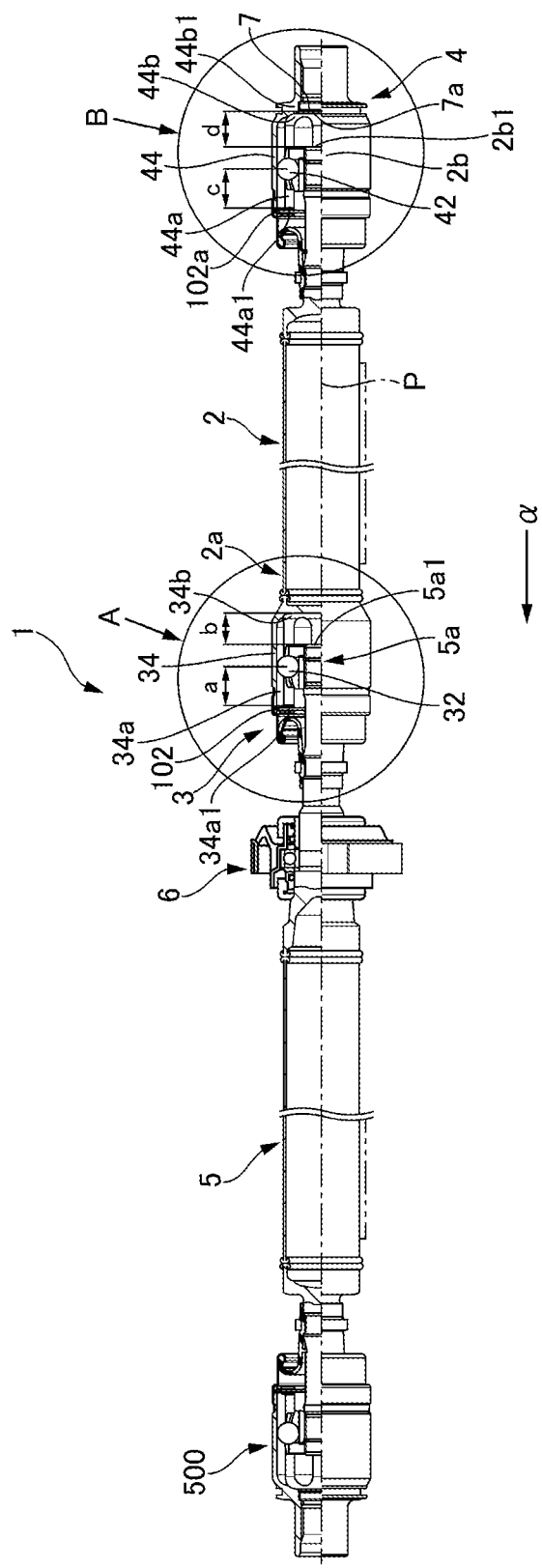
FIG. 1 illustrates the overall configuration of a propeller shaft according to a first embodiment.

FIG. 1 illustrates the overall configuration of a propeller shaft according to a first embodiment.

In the following description, the present embodiment will be described referring to the left side and the right side in FIG. 1 as a "vehicle front side" and a "vehicle rear side", respectively, for convenience.

(Configuration of Propeller Shaft)

A propeller shaft 1 includes a second shaft member 5 and a first shaft member 2. The second shaft member 5 is integrally rotatably coupled via a third constant-velocity joint 500 coupled with a transmission coupled with a not-illustrated engine serving as a driving source. The first shaft member 2 is integrally rotatably coupled via a second constant-velocity joint 4 coupled with a differential coupled with a not-illustrated driving wheel. Both the above-described shaft members 2 and 5 are integrally rotatably coupled via a first constant-velocity joint 3. Along therewith, the propeller shaft 1 is rotatably supported via a center bearing support 6 suspended on a not-illustrated vehicle body, which is provided near this first constant-velocity joint 3.

Assume that "a" represents a distance between first balls 32 of the first constant-velocity joint 3 and edge portions 34a1 of first race grooves 34a formed on the inner periphery of a first outer race member 34, "b" represents a distance between a bottom portion 34b of the first outer race member 34 of the first constant-velocity joint 3 and an end surface 5a1 of the second shaft member 5, "c" represents a distance between second balls 42 of the second constant-velocity joint 4 and edge portions 44a1 of second race grooves 44a formed on the inner periphery of a second outer race member 44, and "d" represents a distance between a surface 7a of a grease sealing cover 7 on the first shaft member 2 side, which is fixedly press-fitted in a through-hole 44b1 of a bottom portion 44b of the second outer race member 44 of the second constant-velocity joint 4, and an end surface 2b1 of the first shaft member 2. Then, the relationship among these distances is set to b<c and d<a.

As a result, when the propeller shaft 1 is coupled with the differential coupled with the not-illustrated driving wheel with the third constant-velocity joint 500 coupled with the not-illustrated transmission and the second shaft member 5 rotatably supported via the center bearing support 6 supported on the not-illustrated vehicle body, the present configuration allows the second constant-velocity joint 4 to be slidably moved in a direction indicated by an arrow α (toward the vehicle front side) along a rotational axis P by a distance (b+d) by slidably moving the second constant-velocity joint 4 in the direction indicated by the arrow a (toward the vehicle front side) along the rotational axis P by the distance d at which abutment is established between the surface 7a of the grease sealing cover 7 on the first shaft member 2 side, which is fixedly press-fitted in the through-hole 44b1 of the bottom portion 44b of the second outer race member 44 of the second constant-velocity joint 4, and the end surface 2b1 of the first shaft member 2, and, further, slidably moving the second constant-velocity joint 4 and the first shaft member 2 in the direction indicated by the arrow α (toward the vehicle front side) by the distance b at which abutment is established between the bottom portion 34b of the first outer race member 34 of the first constant-velocity joint 3 and the end surface 5a1 of the second shaft member 5. Therefore, the propeller shaft 1 can considerably increase the sliding movement amount and thus improve the workability for the mounting of the propeller shaft 1 onto the vehicle.

Further, because each of the distances is set to b<c and d<a, when the first shaft member 2 is slidably moved from a second end portion 2b toward a first end portion 2a or is slidably moved from the first end portion 2a toward the second end portion 2b, i.e., even when the first shaft member 2 is slidably moved in the direction indicated by the arrow a or in the opposite direction therefrom, the movement of the first shaft member 2 is stopped due to the abutment between the bottom portion 34b of the highly rigid first outer race member 34 of the first constant-velocity joint 3 and the end surface 5a1 of the second shaft member 5 or the abutment between the surface 7a of the grease sealing cover 7 on the first shaft member 2 side (the vehicle front side), which is fixedly press-fitted in the through-hole 44b1 of the bottom portion 44b of the second outer race member 44 of the second constant-velocity joint 4 and is formed so as to have high rigidity, and the end surface 2b1 of the first shaft member 2 before each of the balls 32 and 42 abuts against each of circlips 102 an 102a, respectively. Therefore, the propeller shaft 1 can prevent damage from being inflicted on each of the balls 32 and 42 and each of the circlips 102 and 102a, thereby also enhancing the durability of the propeller shaft 1.

Figure 2:
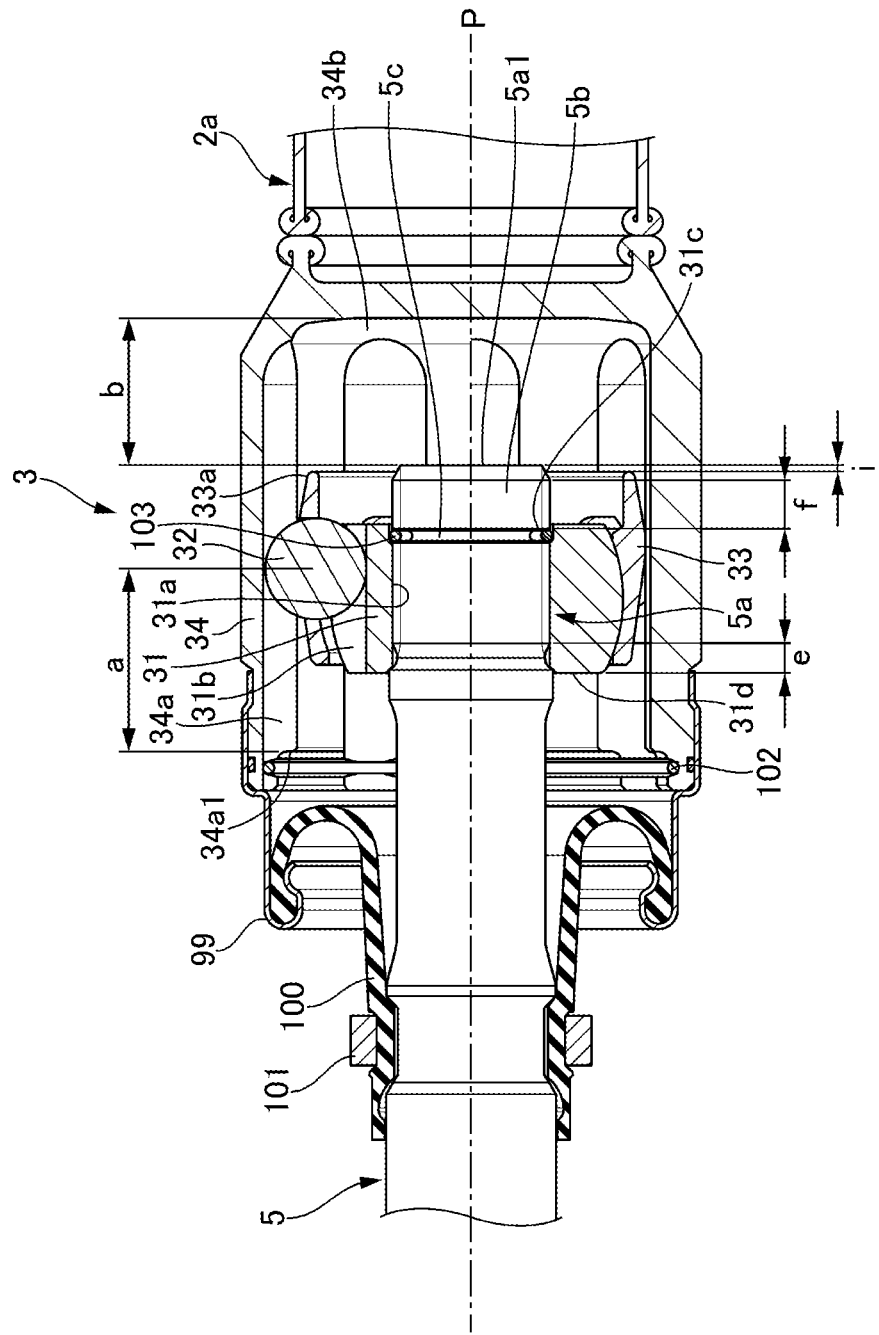
FIG. 2 is an enlarged cross-sectional view of a first constant-velocity joint 3 and a second shaft member 5 in an A portion in FIG. 1.

FIG. 2 is an enlarged cross-sectional view of the first constant-velocity joint 3 and the second shaft member 5 in an A portion in FIG. 1.

(Configuration of First Constant-Velocity Joint)

The configuration of the first constant-velocity joint 3 will be described.

The first constant-velocity joint 3 includes a first inner race member 31, the plurality of first balls 32, a first cage 33, and the first outer race member 34. A first female spline 31a is provided on the inner periphery of the first inner race member 31. The plurality of first balls 32 is disposed in a plurality of grooves 31b on the outer periphery of the first inner race member 31 in a radial direction with respect to the rotational axis P. The first cage 33 holds the plurality of first balls 32 on the first inner race member 31. The plurality of first race grooves 34a, in which the plurality of first balls 32 is movable in the direction of the rotational axis P, is provided on the inner periphery of the first outer race member 34, and the first end portion 2a of the first shaft member 2 is coupled with the end portion of the first outer race member 34 on the vehicle rear side by being fixedly welded thereto.

The second shaft member 5, which is supported on the not-illustrated vehicle body by the center bearing support 6, is inserted in the first inner race member 31 in such a manner that a second male spline 5b formed on the outer peripheral surface of one end portion 5a is splined to the first female spline 31a of the first inner race member 31.

Further, an inner peripheral groove 31c and an outer peripheral groove 5c are formed on the way along the first female spline 31a and the second male spline 5b at the respective positions facing each other, and a circlip 103 is inserted in each of the grooves 31c and 5c, thereby preventing the second shaft member 5 from being detached off from the first inner race member 31.

The propeller shaft 1 is formed in such a manner that a distance f between the end surface 5a1 of the one end portion 5a of the second shaft member 5 on the vehicle rear side and the outer peripheral groove 5c is longer than a distance e between an end surface 31d of the first inner race member 31 on the vehicle front side opposite from the one end portion 5a and the first female spline 31a.

When the second shaft member 5 is inserted into the first inner race member 31, the insertion work is performed in a state that the circlip 103 inserted in the outer peripheral groove 5c of the second shaft member 5 is compressed using a tool. Then, the present configuration allows both the splines 31a and 5b to be visibly confirmed without the worker's view blocked by the circlip 103 and the tool, thereby realizing smooth insertion work.

Further, the end surface 5a1 of the one end portion 5a of the second shaft member 5 on the vehicle rear side protrudes beyond an end surface 33a of one end portion of the first cage 33 on the vehicle rear side toward the vehicle rear side by a distance i.

This protrusion allows the movement of the first outer race member 34 to be stopped with the aid of the abutment between the bottom portion 34b of the highly rigid first outer race member 34 of the first constant-velocity joint 3 and the end surface 5a1 of the second shaft member 5 when the first outer race member 34 is slidably moved toward the vehicle front side by the distance b, thereby being able to prevent damage from being inflicted on the first balls 32 or the first cage 33.

Further, the end portion of the first constant-velocity joint 3 on the vehicle front side is surrounded by an attachment tool 99 fixed to the outer periphery of the first outer race member 34 on the vehicle front side and a waterproof boot 100 attached using a boot band 101, and is sealed between the first outer race member 34 and the second shaft member 5.

Figure 3:
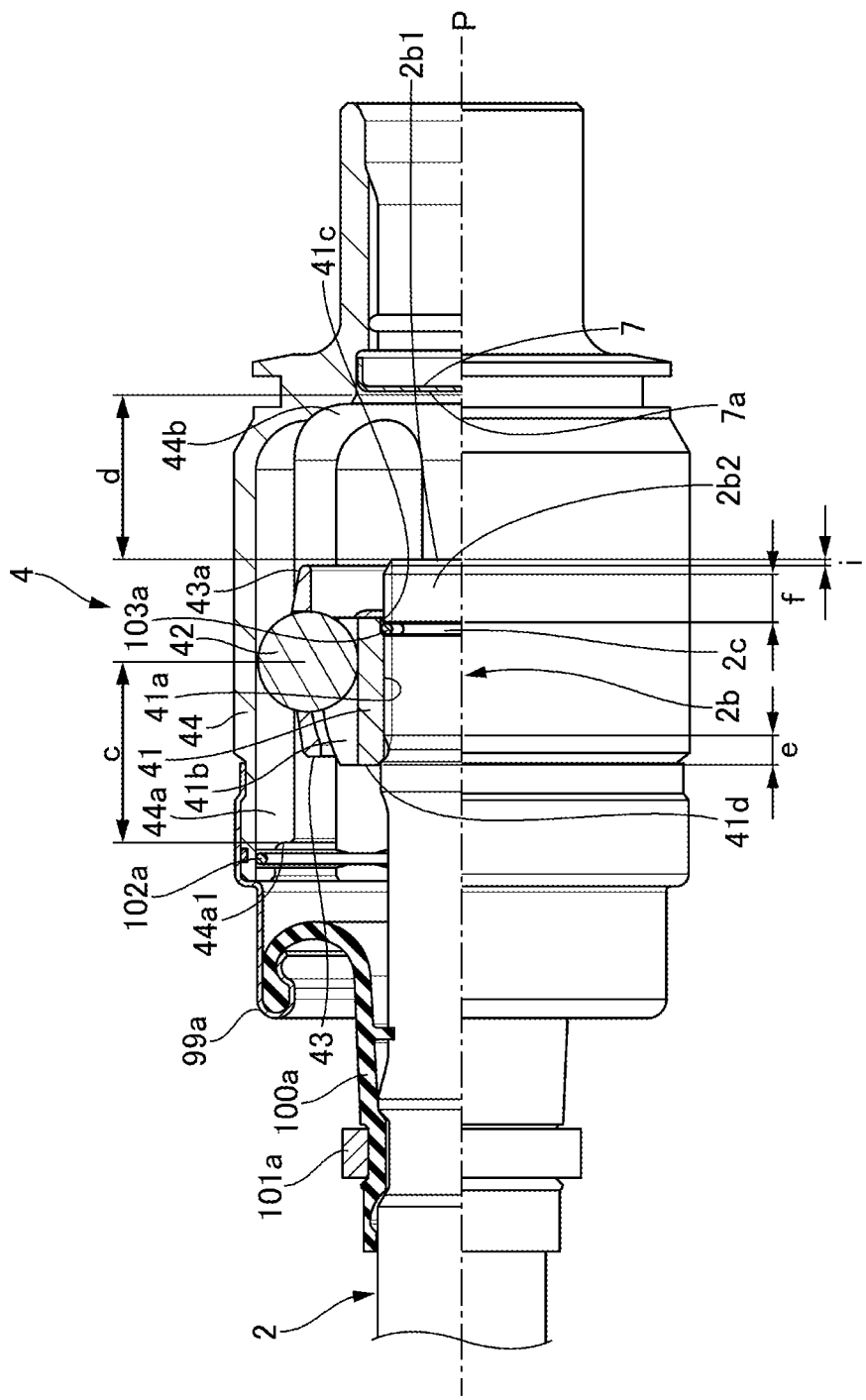
FIG. 3 is an enlarged view of a second constant-velocity joint 4 and a first shaft member 2 in a B portion in FIG. 1.

FIG. 3 is an enlarged view of the second constant-velocity joint 4 and the first shaft member 2 in a B portion in FIG. 1.

(Configuration of Second Constant-Velocity Joint)

The configuration of the second constant-velocity joint 4 will be described.

The second constant-velocity joint 4 includes a second inner race member 41, the plurality of second balls 42, a first cage 43, and the second outer race member 44. A second female spline 41a is provided on the inner periphery of the second inner race member 41. The plurality of second balls 42 is disposed in a plurality of grooves 41b on the outer periphery of the second inner race member 41 in the radial direction with respect to the rotational axis P. The second cage 43 holds the plurality of second balls 42 on the second inner race member 41. The plurality of second race grooves 44a, in which the plurality of second balls 42 is movable in the direction of the rotational axis P, is provided on the inner periphery of the second outer race member 44.

The first shaft member 2 is inserted in the second inner race member 41 in such a manner that a first male spline 2b2 formed on the outer peripheral surface of the second end portion 2b is splined to the second female spline 41a of the second inner race member 41.

Further, an inner peripheral groove 41c and an outer peripheral groove 2c are formed on the way along the second female spline 41a and the first male spline 2b2 at the respective positions facing each other, and a circlip 103a is inserted in each of the grooves 41c and 2c, thereby preventing the first shaft member 2 from being detached off from the second inner race member 41.

The propeller shaft 1 is formed in such a manner that the distance f between the end surface 2b1 of the second end portion 2b of the first shaft member 2 on the vehicle rear side and the outer peripheral groove 2c is longer than the distance e between an end surface 41d of the second inner race member 41 on the first end portion 2a side on the vehicle front side and the second female spline 41a.

When the first shaft member 2 is inserted into the second inner race member 41, the insertion work is performed in a state that the circlip 103a inserted in the outer peripheral groove 2c of the first shaft member 2 is compressed using a tool. Then, the present configuration allows both the splines 41a and 2b2 to be visibly confirmed without the worker's view blocked by the circlip 103a and the tool, thereby realizing smooth insertion work.

Further, the end surface 2b1 of the second end portion 2b of the first shaft member 2 on the vehicle rear side protrudes beyond an end surface 43a of one end portion of the second cage 43 on the vehicle rear side toward the vehicle rear side by the distance i.

This protrusion allows the movement of the second outer race member 44 to be stopped with the aid of the abutment between the surface 7a of the grease sealing cover 7 on the vehicle front side (the first shaft member 2 side), which is fixedly press-fitted in the through-hole 44b1 of the bottom portion 44b of the second outer race member 44 of the second constant-velocity joint 4 and is formed so as to have high rigidity, and the end surface 2b1 of the first shaft member 2 when the second outer race member 44 is slidably moved toward the vehicle front side by the distance d, thereby being able to prevent damage from being inflicted on the second balls 42 or the second cage 43.

Further, the end portion of the second constant-velocity joint 4 on the vehicle front side is surrounded by an attachment tool 99a fixed to the outer periphery of the second outer race member 44 on the vehicle front side and a waterproof boot 100a attached using a boot band 101a, and is sealed between the second outer race member 44 and the first shaft member 2.

Next, the advantageous effects will be described.

The advantageous effects of the propeller shaft 1 according to the first embodiment will be described now.

(1) The propeller shaft 1 is configured in such a manner that, when the propeller shaft 1 is coupled with the not-illustrated differential, the present configuration allows the second constant-velocity joint 4 to be slidably moved in the direction indicated by the arrow α (toward the vehicle front side) along the rotational axis P by the distance (b+d) by slidably moving the second constant-velocity joint 4 in the direction indicated by the arrow a (toward the vehicle front side) along the rotational axis P by the distance d at which abutment is established between the surface 7a of the grease sealing cover 7 on the first shaft member 2 side, which is fixedly press-fitted in the through-hole 44b1 of the bottom portion 44b of the second outer race member 44 of the second constant-velocity joint 4, and the end surface 2b1 of the first shaft member 2, and, further, slidably moving the second constant-velocity joint 4 and the first shaft member 2 in the direction indicated by the arrow α (toward the vehicle front side) by the distance b at which abutment is established between the bottom portion 34b of the first outer race member 34 of the first constant-velocity joint 3 and the end surface 5a1 of the second shaft member 5.

Therefore, since the second constant-velocity joint 4 can be slidably moved in the direction indicated by the arrow a (toward the vehicle front side) along the rotational axis P by the distance (b+d), the propeller shaft 1 can considerably increase the sliding movement amount and thus improve the workability for the mounting of the propeller shaft 1 onto the vehicle.

(2) Assume that "a" represents the distance between the first balls 32 of the first constant-velocity joint 3 and the edge portions 34a1 of the first race grooves 34a formed on the inner periphery of the first outer race member 34, "b" represents the distance between the bottom portion 34b of the first outer race member 34 of the first constant-velocity joint 3 and the end surface 5a1 of the second shaft member 5, "c" represents the distance between the second balls 42 of the second constant-velocity joint 4 and the edge portions 44a1 of the second race grooves 44a formed on the inner periphery of the second outer race member 44, and "d" represents the distance between the surface 7a of the grease sealing cover 7 on the first shaft member 2 side, which is fixedly press-fitted in the through-hole 44b1 of the bottom portion 44b of the second outer race member 44 of the second constant-velocity joint 4, and the end surface 2b1 of the first shaft member 2. Then, the propeller shaft 1 is configured in such a manner that the relationship among these distances is set to b<c and d<a.

Therefore, when the first shaft member 2 is slidably moved from the second end portion 2b toward the first end portion 2a or is slidably moved from the first end portion 2a toward the second end portion 2b, i.e., even when the first shaft member 2 is slidably moved in the direction indicated by the arrow α or in the opposite direction therefrom, the movement of the first shaft member 2 is stopped due to the abutment between the bottom portion 34b of the highly rigid first outer race member 34 of the first constant-velocity joint 3 and the end surface 5a1 of the second shaft member 5 or the abutment between the surface 7a of the grease sealing cover 7 on the first shaft member 2 side, which is fixedly press-fitted in the through-hole 44b1 of the bottom portion 44b of the second outer race member 44 of the second constant-velocity joint 4 and is formed so as to have high rigidity, and the end surface 2b1 of the first shaft member 2 before the balls 32 and 42 abut against the circlips 102 and 102a, respectively. Therefore, the propeller shaft 1 can prevent damage from being inflicted on each of the balls 32 and 42 and each of the circlips 102 and 102a, also enhancing the durability of the propeller shaft 1.

(3) The propeller shaft 1 is configured in such a manner that the end surface 5a1 of the one end portion 5a of the second shaft member 5 on the vehicle rear side protrudes beyond the end surface 33a of the one end portion of the first cage 33 on the vehicle rear side toward the vehicle rear side by the distance i.

This protrusion allows the movement of the first outer race member 34 to be stopped with the aid of the abutment between the bottom portion 34b of the highly rigid first outer race member 34 of the first constant-velocity joint 3 and the end surface 5a1 of the second shaft member 5 when the first outer race member 34 is slidably moved toward the vehicle front side by the distance b, thereby being able to prevent damage from being inflicted on the first balls 32 or the first cage 33.

(4) The propeller shaft 1 is configured in such a manner that the end surface 2b1 of the second end portion 2b of the first shaft member 2 on the vehicle rear side protrudes beyond the end surface 43a of the one end portion of the second cage 43 on the vehicle rear side toward the vehicle rear side by the distance i.

This protrusion allows the movement of the second outer race member 44 to be stopped with the aid of the abutment between the surface 7a of the grease sealing cover 7 on the first shaft member 2 side on the vehicle front side, which is fixedly press-fitted in the through-hole 44b1 of the bottom portion 44b of the second outer race member 44 of the second constant-velocity joint 4 and is formed so as to have high rigidity, and the end surface 2b1 of the first shaft member 2 when the second outer race member 44 is slidably moved toward the vehicle front side by the distance d, thereby being able to prevent damage from being inflicted on the second balls 42 or the second cage 43.

(5) The propeller shaft 1 is formed in such a manner that the distance f between the end surface 5a1 of the one end portion 5a of the second shaft member 5 on the vehicle rear side and the outer peripheral groove 5c is longer than the distance e between the end surface 31d of the first inner race member 31 on the vehicle front side opposite from the one end portion 5a and the first female spline 31a.

When the second shaft member 5 is inserted into the first inner race member 31, the insertion work is performed in the state that the circlip 103 inserted in the outer peripheral groove 5c of the second shaft member 5 is compressed using the tool. Then, the present configuration allows both the splines 31a and 5b to be visibly confirmed without the worker's view blocked by the circlip 103 and the tool, thereby realizing smooth insertion work.

(6) The propeller shaft 1 is formed in such a manner that the distance f between the end surface 2b1 of the second end portion 2b of the first shaft member 2 on the vehicle rear side and the outer peripheral groove 2c is longer than the distance e between the end surface 41d of the second inner race member 41 on the first end portion 2a side on the vehicle front side and the second female spline 41a.

When the first shaft member 2 is inserted into the second inner race member 41, the insertion work is performed in the state that the circlip 103a inserted in the outer peripheral groove 2c of the first shaft member 2 is compressed using the tool. Then, the present configuration allows both the splines 41a and 2b2 to be visibly confirmed without the worker's view blocked by the circlip 103a and the tool, thereby realizing smooth insertion work.

Second Embodiment

Figure 4:
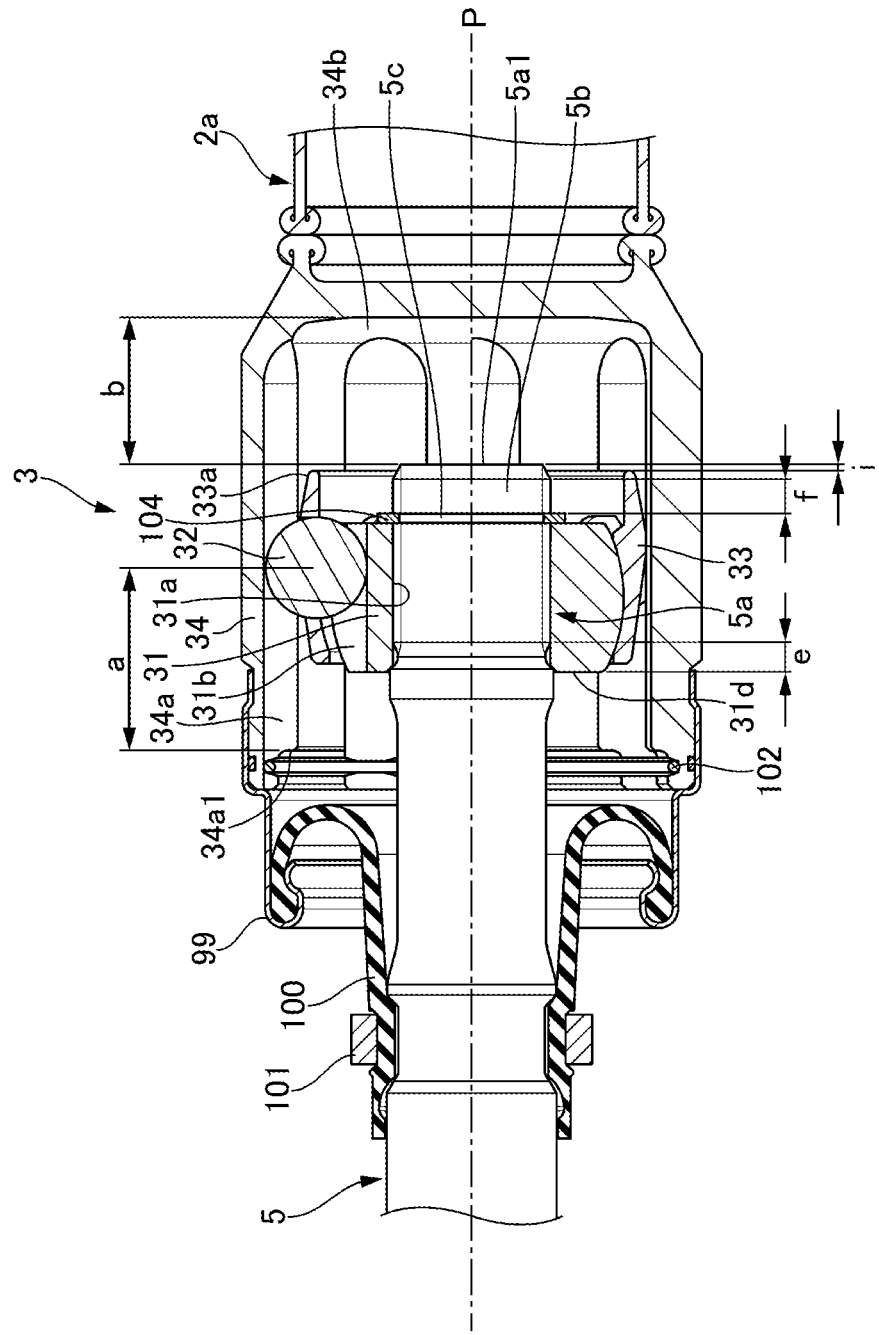
FIG. 4 is an enlarged cross-sectional view of the first constant-velocity joint 3 and the second shaft member 5 according to a second embodiment.

FIG. 4 is an enlarged cross-sectional view of the first constant-velocity joint 3 and the second shaft member 5 according to a second embodiment.

Differently from the first embodiment, a snap ring 104 is used to prevent the detachment between the first constant-velocity joint 3 and the second shaft member 5 instead of the circlip 103.

Further, the snap ring 104 is attached after the second shaft member 5 and the first inner race member 31 are assembled, and the sub-assembled second shaft member 5 and the first inner race member 31 are mounted in the first outer race member 34.

The other configuration is similar to the first embodiment, and therefore features shared with the first embodiment will be identified by the same reference numerals as the first embodiment and descriptions thereof will be omitted here.

The snap ring 104 can also be used for the second constant-velocity joint 4 to prevent the detachment instead of the circlip 103a although the illustration thereof is omitted here.

Next, the advantageous effects will be described.

The propeller shaft 1 according to the second embodiment can bring about similar advantageous effects to the first embodiment.

Third Embodiment

Figure 5:
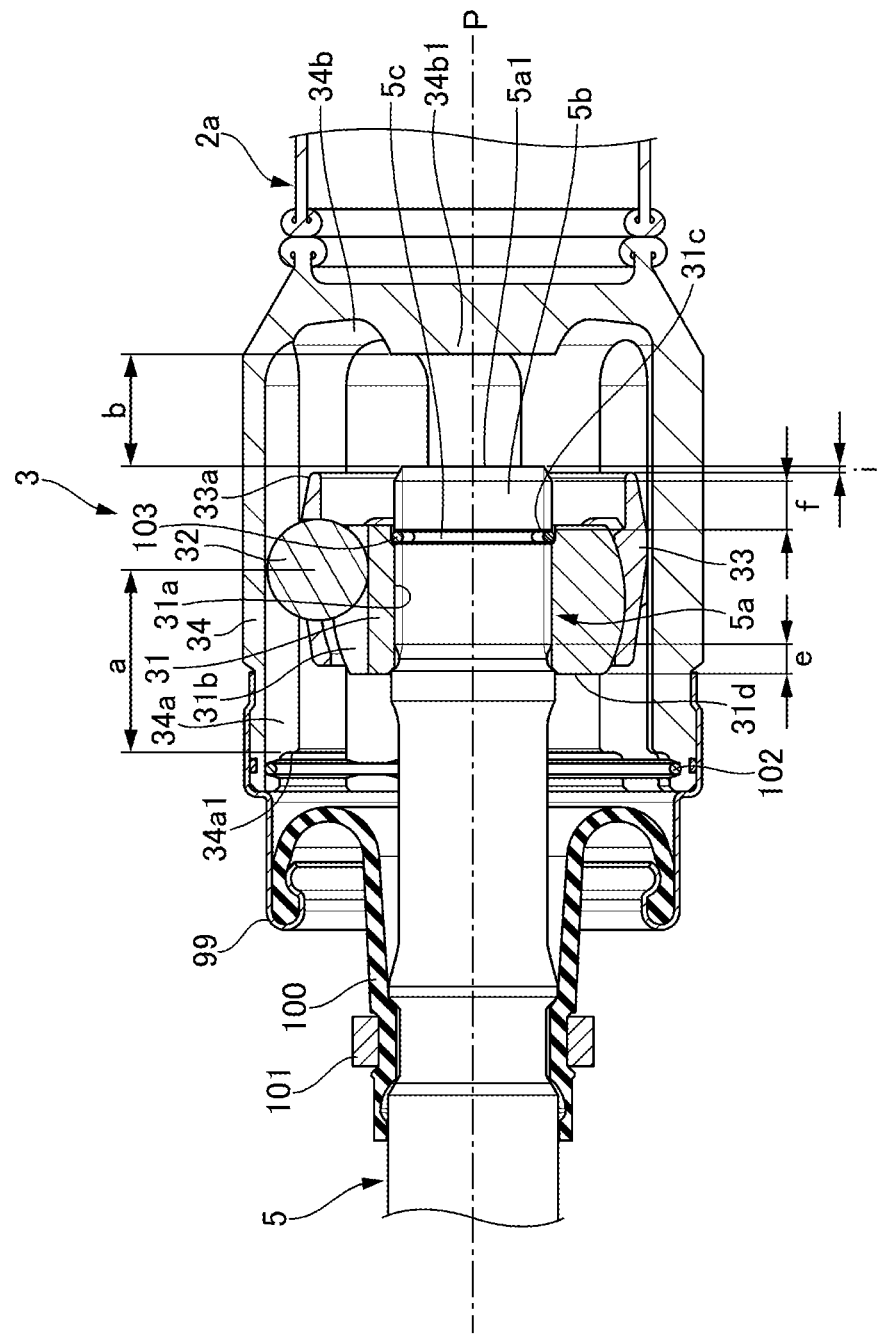
FIG. 5 is an enlarged cross-sectional view of the first constant-velocity joint 3 and the second shaft member 5 according to a third embodiment.

FIG. 5 is an enlarged cross-sectional view of the first constant-velocity joint 3 and the second shaft member 5 according to a third embodiment.

Differently from the first embodiment, a protrusion portion 34b1 is formed by increasing the thickness of the central portion of the bottom portion 34b of the first outer race member 34 of the first constant-velocity joint 3 to cause it to bulge in a protruding manner in the direction indicated by the arrow a toward the vehicle front side that extends from the second end portion 2b toward the first end portion 2a.

The other configuration is similar to the first embodiment, and therefore features shared with the first embodiment will be identified by the same reference numerals as the first embodiment and descriptions thereof will be omitted here.

A protrusion portion may be formed by increasing the thickness of the central portion of the grease sealing cover 7 fixedly press-fitted in the through-hole 44b1 of the bottom portion 44b of the second outer race member 44 of the second constant-velocity joint 4 to cause it to bulge in a protruding manner in the direction indicated by the arrow α toward the vehicle front side that extends from the second end portion 2b toward the first end portion 2a, although the illustration thereof is omitted here.

Next, the advantageous effects will be described.

The propeller shaft 1 according to the third embodiment can bring about the following advantageous effects in addition to the advantageous effects of the first embodiment.

(1) The propeller shaft 1 according to the third embodiment is configured in such a manner that the protrusion portion or the protrusion portion 34b1 is formed by increasing the thickness of the central portion of the grease sealing cover 7 fixedly press-fitted in the through-hole 44b1 of the bottom portion 44b of the second outer race member 44 or the bottom portion 34b of the first outer race member 34 of the first constant-velocity joint 3, against which the end surface 2b1 of the first shaft member 2 or the end surface 5a1 of the second shaft member 5 abuts, to cause it to bulge in a protruding manner in the direction indicated by the arrow α toward the vehicle front side that extends from the second end portion 2b toward the first end portion 2a.

Therefore, the propeller shaft 1 can further enhance the rigidity of the portion that the end surface 2b1 of the first shaft member 2 or the end surface 5a1 of the second shaft member 5 abuts against, thereby being able to reliably stop the sliding movement of each of the constant-velocity joints 3 and 4.

Fourth Embodiment

Figure 6:
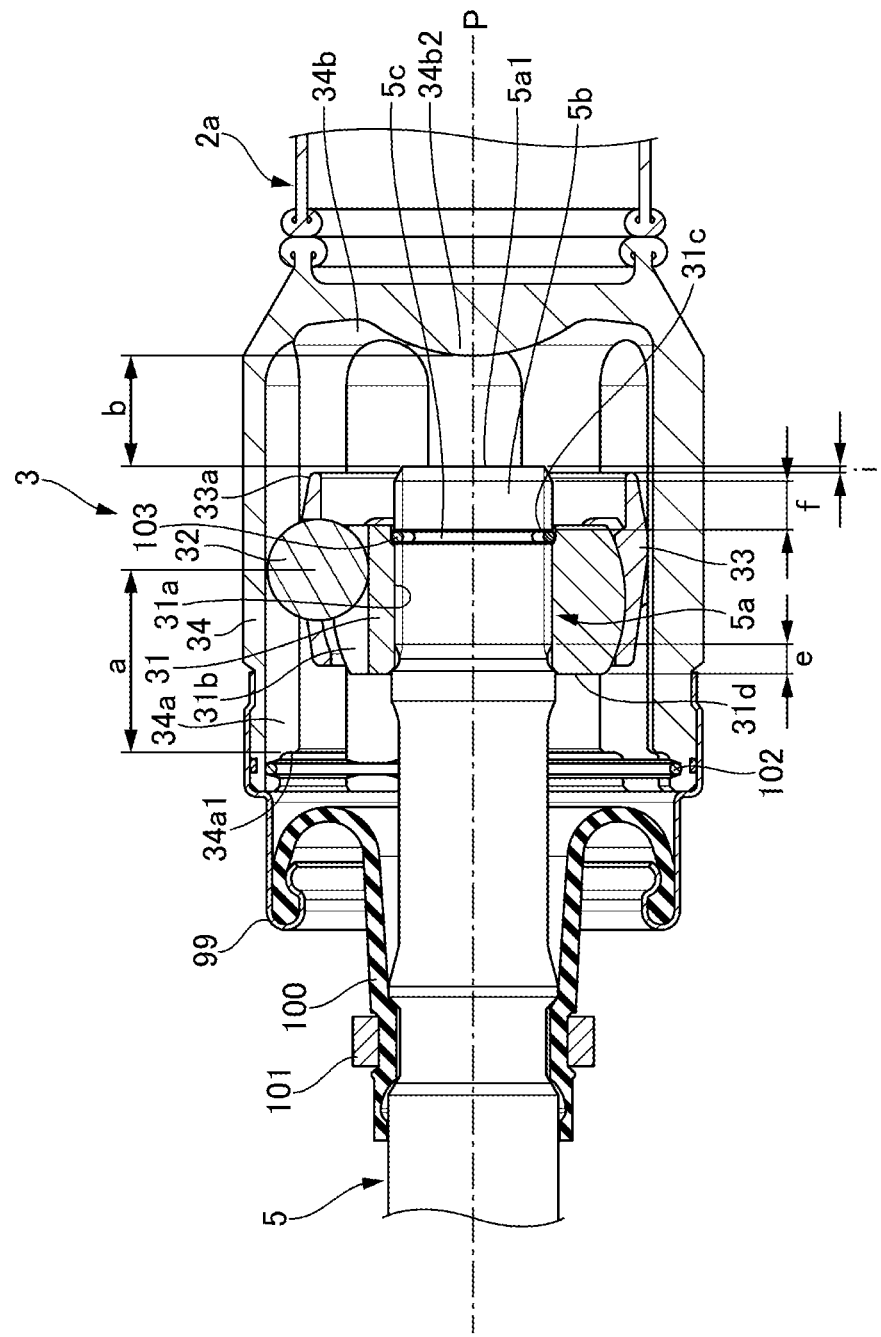
FIG. 6 is an enlarged cross-sectional view of the first constant-velocity joint 3 and the second shaft member 5 according to a fourth embodiment.

FIG. 6 is an enlarged cross-sectional view of the first constant-velocity joint 3 and the second shaft member 5 according to a fourth embodiment.

Differently from the third embodiment, an R-shaped protrusion portion 34b2 is formed by increasing the thickness of the central portion of the bottom portion 34b of the first outer race member 34 of the first constant-velocity joint 3 and shaping it into an R-like shape to cause it to bulge in the direction indicated by the arrow a toward the vehicle front side that extends from the second end portion 2b toward the first end portion 2a.

The other configuration is similar to the third embodiment, and therefore features shared with the third embodiment will be identified by the same reference numerals as the third embodiment and descriptions thereof will be omitted here.

A protrusion portion may be formed by causing the thickness of the central portion of the grease sealing cover 7 fixedly press-fitted in the through-hole 44b1 of the bottom portion 44b of the second outer race member 44 of the second constant-velocity joint 4 to bulge in a protruding manner in the direction indicated by the arrow α toward the vehicle front side that extends from the second end portion 2b toward the first end portion 2a, although the illustration thereof is omitted here.

Next, the advantageous effects will be described.

The propeller shaft 1 according to the fourth embodiment can bring about the following advantageous effects in addition to the advantageous effects of the third embodiment.

(1) The propeller shaft 1 according to the fourth embodiment is configured in such a manner that the protrusion portion or the protrusion portion 34b2 is formed by increasing the thickness of the central portion of the grease sealing cover 7 fixedly press-fitted in the through-hole 44b1 of the bottom portion 44b of the second outer race member 44 or the bottom portion 34b of the first outer race member 34 of the first constant-velocity joint 3, against which the end surface 2b1 of the first shaft member 2 or the end surface 5a1 of the second shaft member 5 abuts, and shaping it into an R-like shape to cause it to bulge in the direction indicated by the arrow α toward the vehicle front side that extends from the second end portion 2b toward the first end portion 2a.

Therefore, the propeller shaft 1 can reduce the change amount of the sliding movement even when the first shaft member 2 or the second shaft member 5 abuts against the protrusion portion, which is formed by increasing the thickness of the central portion of the grease sealing cover 7 fixedly press-fitted in the through-hole 44b1 of the bottom portion 44b of the second outer race member 44 and shaping it into an R-like shape to cause it to bulge toward the vehicle front side, or the protrusion portion 34b2, which is formed by increasing the thickness of the bottom portion 34b of the first outer race member 34 of the first constant-velocity joint 3 and shaping it into an R-like shape to cause it to bulge toward the vehicle front side, in a tilted state.

Fifth Embodiment

Figure 7:
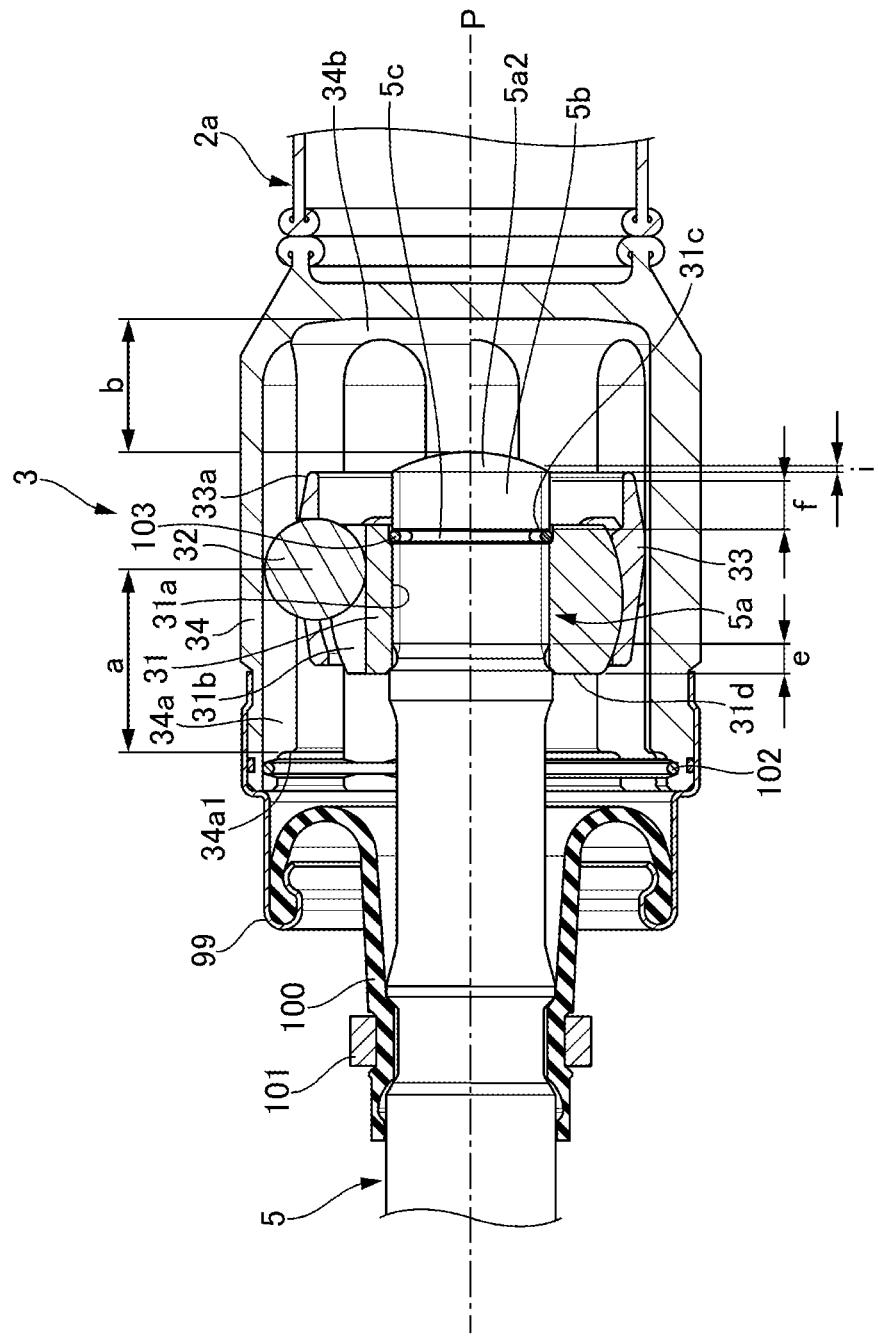
FIG. 7 is an enlarged cross-sectional view of the first constant-velocity joint 3 and the second shaft member 5 according to a fifth embodiment.

FIG. 7 is an enlarged cross-sectional view of the first constant-velocity joint 3 and the second shaft member 5 according to a fifth embodiment.

Differently from the fourth embodiment, the present embodiment shapes the end surface 5a2 of the second shaft member 5 into an R-like shape to cause it to protrude toward the vehicle rear side, instead of increasing the thickness of the grease sealing cover 7 fixedly press-fitted in the through-hole 44b1 of the bottom portion 44b of the second outer race member 44 or the bottom portion 34b of the first outer race member 34 of the first constant-velocity joint 3 and shaping it into an R-like shape.

The other configuration is similar to the fourth embodiment, and therefore features shared with the fourth embodiment will be identified by the same reference numerals as the fourth embodiment and descriptions thereof will be omitted here.

The end surface 2b1 of the first shaft member 2 may be shaped into an R-like shape to cause it to protrude toward the vehicle rear side, although the illustration thereof is omitted here.

Next, the advantageous effects will be described.

The propeller shaft 1 according to the fifth embodiment can bring about similar advantageous effects to the fourth embodiment.

Sixth Embodiment

Figure 8B:
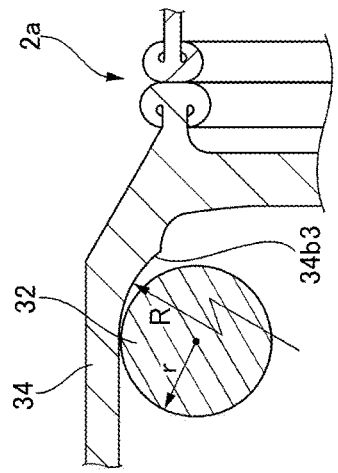
FIG. 8(b) is a partial enlarged cross-sectional view of the first constant-velocity joint 3 and the second shaft member 5 according to the sixth embodiment.
Figure 8A:
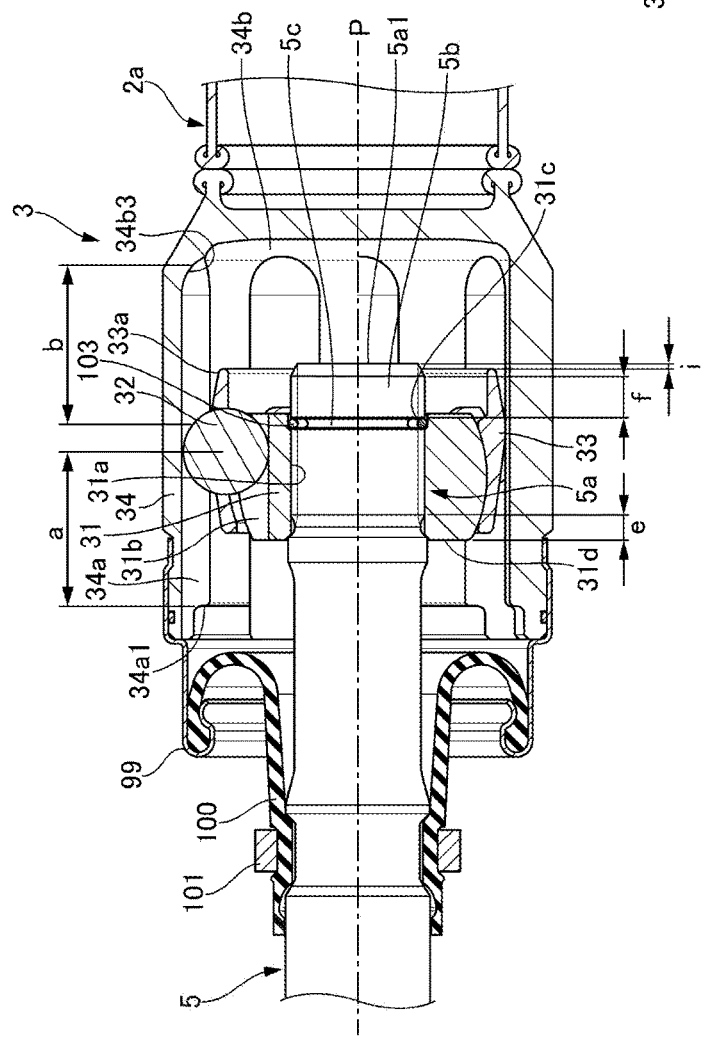
FIG. 8(*a*) is an enlarged cross-sectional view of the first constant-velocity joint 3 and the second shaft member 5 according to a sixth embodiment.

FIG. 8(a) is an enlarged cross-sectional view of the first constant-velocity joint 3 and the second shaft member 5 according to a sixth embodiment, and FIG. 8(b) is a partial enlarged cross-sectional view of the first constant-velocity joint 3 and the second shaft member 5 according to the sixth embodiment.

Differently from the first embodiment, the propeller shaft 1 is configured to stop the sliding movement by bringing the first balls 32 of the first constant-velocity joint 3 into abutment with end portions 34b3 of the first race grooves 34a of the first outer race member 34 on the vehicle rear side.

The end portions 34b3 of the first race member 34a of the first outer race member 34 on the vehicle rear side are formed so as to have a larger radius R than a radius r of the first balls 32.

As a result, the propeller shaft 1 can prevent damage from being inflicted on the first balls 32.

The other configuration is similar to the first embodiment, and therefore features shared with the first embodiment will be identified by the same reference numerals as the first embodiment and descriptions thereof will be omitted here.

The propeller shaft 1 may be configured to stop the sliding movement by bringing the second balls 42 of the second constant-velocity joint 4 into abutment with the end portions of the second race grooves 44a of the second outer race member 44 on the vehicle rear side, although the illustration thereof is omitted here.

Further, the end portions of the second race grooves 44a of the second outer race member 44 on the vehicle rear side are formed so as to have the larger radius R than the radius r of the second balls 42 in this case.

Next, the advantageous effects will be described.

The propeller shaft 1 according to the sixth embodiment can bring about the following advantageous effects.

(1) The propeller shaft 1 according to the sixth embodiment is configured in such a manner that, when the propeller shaft 1 is coupled with the not-illustrated differential, the second constant-velocity joint 4 is slidably moved in the direction indicated by the arrow α (toward the vehicle front side) along the rotational axis P by the distance (b+d) by slidably moving the second constant-velocity joint 4 in the direction indicated by the arrow α (toward the vehicle front side) along the rotational axis P by the distance d at which abutment is established between the second balls 42 of the second constant-velocity joint 4 and the end portions of the second race grooves 44a of the second outer race member 44 on the vehicle rear side, and, further, slidably moving the second constant-velocity joint 4 and the first shaft member 2 in the direction indicated by the arrow α (toward the vehicle front side) by the distance b at which abutment is established between the first balls 32 of the first constant-velocity joint 3 and the end portions 34b3 of the first race grooves 34a of the first outer race member 34 on the vehicle rear side.

Therefore, since the second constant-velocity joint 4 can be slidably moved in the direction indicated by the arrow α (toward the vehicle front side) along the rotational axis P by the distance (b+d), the propeller shaft 1 can considerably increase the sliding movement amount and thus improve the workability for the mounting of the propeller shaft 1 onto the vehicle.

(2) Assume that "a" represents the distance between the first balls 32 of the first constant-velocity joint 3 and the edge portions 34a1 of the first race grooves 34a formed on the inner periphery of the first outer race member 34, "b" represents the distance between the first balls 32 of the first constant-velocity joint 3 and the end portions 34b3 of the first race grooves 34a of the first outer race member 34 on the vehicle rear side, "c" represents the distance between the second balls 42 of the second constant-velocity joint 4 and the edge portions 44a1 of the second race grooves 44a formed on the inner periphery of the second outer race member 44, and "d" represents the distance between the second balls 42 of the second constant-velocity joint 4 and the end portions of the second race grooves 44a formed on the inner periphery of the second outer race member 44 on the vehicle rear side. Then, the propeller shaft 1 is configured in such a manner that the relationship among these distances is set to b<c and d<a.

Therefore, when the first shaft member 2 is slidably moved from the second end portion 2b toward the first end portion 2a or is slidably moved from the first end portion 2a toward the second end portion 2b, i.e., even when the first shaft member 2 is slidably moved in the direction indicated by the arrow α (toward the vehicle front side) or in the opposite direction therefrom (toward the vehicle rear side), the movement of the first shaft member 2 is stopped due to the abutment between the end portions 34b3 of the first race grooves 34a formed on the inner periphery of the highly rigid first outer race member 34 of the first constant-velocity joint 3 and the first balls 32 or the end portions of the second race grooves 44a formed on the inner periphery of the second outer race member 44 on the vehicle rear side and the second balls 42 before the balls 32 and 42 abut against the circlips 102 an 102a, respectively. Therefore, the propeller shaft 1 can prevent damage from being inflicted on each of the circlips 102 and 102a, thereby also enhancing the durability of the propeller shaft 1.

(3) The propeller shaft 1 according to the sixth embodiment is formed in such a manner that the radii R of the end portions 34b3 of the first race grooves 34a of the first outer race member 34 on the vehicle rear side and the end portions of the second race grooves 44a formed on the inner periphery of the second outer race member 44 on the vehicle rear side are larger than the radii r of the first balls 32 of the first constant-velocity joint 3 and the second balls 42 of the second constant-velocity joint 4, respectively.

Therefore, the propeller shaft 1 can prevent damage from being inflicted on the first balls 32 of the first constant-velocity joint 3 and the second balls 42 of the second constant-velocity joint 4.

(4) The propeller shaft 1 according to the sixth embodiment is formed in such a manner that the distance f between the end surface 5a1 of the one end portion 5a of the second shaft member 5 on the vehicle rear side and the outer peripheral groove 5c is longer than the distance e between the end surface 31d of the first inner race member 31 on the vehicle front side opposite from the one end portion 5a and the first female spline 31a.

When the second shaft member 5 is inserted into the first inner race member 31, the insertion work is performed in the state that the circlip 103 inserted in the outer peripheral groove 5c of the second shaft member 5 is compressed using the tool. Then, the present configuration allows both the splines 31a and 5b to be visibly confirmed without the worker's view blocked by the circlip 103 and the tool, thereby realizing smooth insertion work.

(6) The propeller shaft 1 according to the sixth embodiment is formed in such a manner that the distance f between the end surface 2b1 of the second end portion 2b of the first shaft member 2 on the vehicle rear side and the outer peripheral groove 2c is longer than the distance e between the end surface 41d of the second inner race member 41 on the first end portion 2a side on the vehicle front side and the second female spline 41a.

When the first shaft member 2 is inserted into the second inner race member 41, the insertion work is performed in the state that the circlip 103a inserted in the outer peripheral groove 2c of the first shaft member 2 is compressed using the tool. Then, the present configuration allows both the splines 41a and 2b2 to be visibly confirmed without the worker's view blocked by the circlip 103a and the tool, thereby realizing smooth insertion work.

Seventh Embodiment

Figure 9:
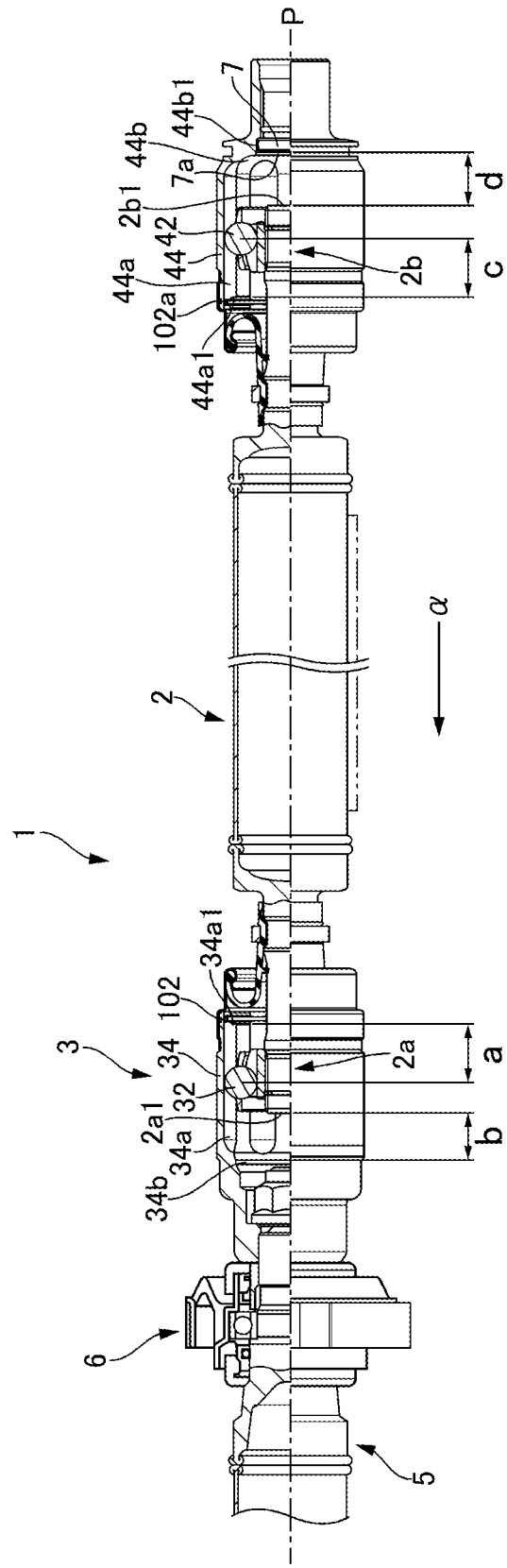
FIG. 9 illustrates the overall configuration of a propeller shaft according to a seventh embodiment.

FIG. 9 illustrates the overall configuration of a propeller shaft according to a seventh embodiment.

Differently from the first embodiment, the outer race member 34 of the first constant-velocity joint 3 and the outer race member 44 of the second constant-velocity joint 4 are disposed opposite from each other instead of the outer race member 34 of the first constant-velocity joint 3 and the outer race member 44 of the second constant-velocity joint 4 disposed in the same direction at both the end portions 2a and 2b of the first shaft member 2, which is the shaft member.

The other configuration is similar to the first embodiment, and therefore features shared with the first embodiment will be identified by the same reference numerals as the first embodiment and descriptions thereof will be omitted here.

Next, the advantageous effects will be described.

The propeller shaft 1 according to the seventh embodiment can bring about similar advantageous effects to the first embodiment.

Other Embodiments

Having described the embodiments for implementing the present invention, the specific configuration of the present invention is not limited to the configurations of the embodiments, and the present invention also includes a design modification and the like thereof made within a range that does not depart from the spirit of the present invention, if any.

The embodiments have been described assuming that the first constant-velocity joint 3 is the type of joint in which the bottom portion 34b of the outer race member 34 is closed and the second constant-velocity joint 4 is the type of joint in which the bottom portion 44b of the outer race member 44 is closed by fixedly press-fitting the grease sealing cover 7 in the through-hole 44b1, but the same type of joint may be used as the first constant-velocity joint 3 and the second constant-velocity joint 4 or the employed type of joint may be switched between the first constant-velocity joint 3 and the second constant-velocity joint 4.

In the following description, technical ideas recognizable from the above-described embodiments will be described.

A propeller shaft, in one configuration thereof, includes a first shaft member including a first end portion and a second end portion that are both end portions in a direction of a rotational axis of the first shaft member. The propeller shaft further includes a first constant-velocity joint. The first constant-velocity joint includes a first inner race member with a first female spline provided thereon, a first ball disposed on an outer periphery of the first inner race member in a radial direction with respect to the rotational axis, a first cage configured to hold the first ball on the first inner race member, and a first outer race member disposed on an outer periphery of the first ball in the radial direction. The first outer race member includes a first race groove in which the first ball is movable in the direction of the rotational axis, and is connected to the first end portion of the first shaft member. The propeller shaft further includes a second constant-velocity joint. The second constant-velocity joint includes a second inner race member including a second female spline provided thereon to which the second end portion of the first shaft member is splined, a second ball disposed on an outer periphery of the second inner race member in the radial direction with respect to the rotational axis, a second cage configured to hold the second ball on the second inner race member, and a second outer race member disposed on an outer periphery of the second ball in the radial direction and including a second race groove in which the second ball is movable in the direction of the rotational axis. The propeller shaft further includes a second shaft member supported on a centering bearing support fixed to the automobile and including one end portion splined to the first female spline. A distance by which the second ball is movable toward an edge portion of the second race groove is longer than a distance by which a bottom portion of the first outer race member is movable toward the first end portion of the first shaft member when the first shaft member is moved from the second end portion toward the first end portion in the direction of the rotational axis, and a distance by which the first ball is movable toward an edge portion of the first race groove is longer than a distance by which the second end portion is movable toward a bottom portion of the second outer race member when the first shaft member is moved from the first end portion toward the second end portion.

According to a further preferable configuration, in the above-described configuration, the one end portion of the second shaft member protrudes beyond an end surface of one end portion of the first cage in the direction of the rotational axis of the first shaft member that extends from the second end portion toward the first end portion, or an end surface of the second end portion of the first shaft member protrudes beyond an end surface of one end portion of the second cage in the direction of the rotational axis of the first shaft member that extends from the first end portion toward the second end portion.

According to further another preferable configuration, in any of the above-described configurations, the bottom portion of the first outer race member is formed into a shape protruding in the direction of the rotational axis of the first shaft member that extends from the second end portion toward the first end portion, or the bottom portion of the second outer race member is formed into a shape protruding in the direction of the rotational axis of the first shaft member that extends from the second end portion toward the first end portion.

According to further another preferable configuration, in any of the above-described configurations, an end surface of the bottom portion of the first outer race member or the one end portion of the second shaft member, or an end surface of the bottom portion of the second outer race member or the second end portion of the first shaft member has an R-like shape.

According to further another preferable configuration, in any of the above-described configurations, the propeller shaft further increases a grease sealing cover. The grease sealing cover provided in a through-hole of the bottom portion of the first outer race member is formed so as to have strength not causing deformation or breakage when the cover contacts an end surface of the one end portion of the second shaft member, or the grease sealing cover provided in a through-hole of the bottom portion of the second outer race member is formed so as to have strength not causing deformation or breakage when the cover contacts an end surface of the second end portion of the first shaft member.

According to further another preferable configuration, in any of the above-described configurations, the movement of the first ball is restricted at an end portion of the first race groove when the first shaft member is moved from the first end portion toward the second end portion in the direction of the rotational axis, or the movement of the second ball is restricted at an end portion of the second race groove when the first shaft member is moved from the first end portion toward the second end portion in the direction of the rotational axis.

According to further another preferable configuration, in any of the above-described configurations, a radius of the end portion of the first race groove of the first outer race member is larger than a radius of the first ball, or a radius of the end portion of the second race groove of the second outer race member is larger than a radius of the second ball.

According to further another preferable configuration, in any of the above-described configurations, the first shaft member includes a first male spline formed on an outer peripheral surface of the second end portion of the first shaft member in the direction of the rotational axis of the first shaft member and configured to be meshed with the second female spline of the second inner race member, and a second inner race member circlip disposed between the second female spline of the second inner race member and the first male spline in the radial direction with respect to the rotational axis of the first shaft member. A distance between an end surface of the second end portion of the first shaft member and the second inner race member circlip is longer than a distance between an end surface of the second inner race member on a first end portion side of the first shaft member and the second female spline. Alternatively, the second shaft member includes a second male spline formed on an outer peripheral surface of the one end portion of the second shaft member in a direction of a rotational axis of the second shaft member and configured to be meshed with the first female spline of the first inner race member, and a first inner race member circlip disposed between the first female spline of the first inner race member and the second male spline in a radial direction with respect to the rotational axis of the second shaft member. A distance between an end surface of the one end portion of the second shaft member and the first inner race member circlip is longer than a distance between an end surface of the first inner race member on an opposite side from the one end portion of the second shaft member and the first female spline.

According to further another preferable configuration, in any of the above-described configurations, the propeller shaft includes a shaft member including a first end portion and a second end portion that are both end portions of a rotational axis of the shaft member. The propeller shaft further includes a first constant-velocity joint. The first constant-velocity joint includes a first inner race member including a first female spline provided thereon to which the first end portion of the shaft member is splined, a first ball disposed on an outer periphery of the first inner race member in a radial direction with respect to the rotational axis, a first cage configured to hold the first ball on the first inner race member, and a first outer race member disposed on an outer periphery of the first ball in the radial direction and including a first race groove in which the first ball is movable in a direction of the rotational axis. The propeller shaft further includes a second constant-velocity joint. The second constant-velocity joint includes a second inner race member including a second female spline provided thereon to which the second end portion of the shaft member is splined, a second ball disposed on an outer periphery of the second inner race member in the radial direction with respect to the rotational axis, a second cage configured to hold the second ball on the second inner race member, and a second outer race member disposed on an outer periphery of the second ball in the radial direction and including a second race groove in which the second ball is movable in the direction of the rotational axis. A distance by which the second ball is movable toward an edge portion of the second race groove is longer than a distance by which the first end portion is movable toward a bottom portion of the first outer race member when the shaft member is moved from the second end portion toward the first end portion in the direction of the rotational axis, and a distance by which the first ball is movable toward an edge portion of the first race groove is longer than a distance by which the second end portion is movable toward a bottom portion of the second outer race member when the shaft member is moved from the first end portion toward the second end portion.

The present invention shall not be limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each of embodiments can also be implemented with another configuration added, deleted, or replaced with respect to a part of the configuration of this embodiment.

The present application claims priority under the Paris Convention to Japanese Patent Application No. 2019-037166 filed on Mar. 1, 2019. The entire disclosure of Japanese Patent Application No. 2019-037166 filed on Mar. 1, 2019 including the specification, the claims, the drawings, and the abstract is incorporated herein by reference in its entirety.

REFERENCE SIGNS LIST 1 propeller shaft
2 first shaft member (shaft member)
2a first end portion
2a1 end surface
2b second end portion
2b1 end surface
2b2 first male spline
3 first constant-velocity joint
31 first inner race member 31a first female spline
31b groove
31c inner peripheral groove
31d end surface
32 first ball
33 first cage
33a end surface
34 first outer race member
34a first race groove
34a1 edge portion
34b bottom portion
34b1 protrusion portion
34b2 R-shaped protrusion portion
34b3 end portion of the first race groove
4 second constant-velocity joint
41 second inner race member
41a second female spline
41b groove
41c inner peripheral groove
41d end surface
42 second ball
43 second cage
43a end surface
44 second outer race member
44a second race groove
44a1 edge portion
44b bottom portion
44b1 through-hole
5 second shaft member
5a one end portion
5a1 end surface
5a2 R-shaped end surface
5b second male spline
6 centering bearing support
7 grease sealing cover
7a surface
10 shaft member
103 first inner race member circlip
103a second inner race member circlip
a distance by which the first ball is movable toward the edge portion of the first race groove
b distance by which the bottom portion of the first outer race member is movable toward the first end portion of the first shaft member or distance by which the first ball is movable toward the end portion of the first race groove
c distance by which the second ball is movable toward the edge portion of the second race groove
d distance by which the second end portion is movable toward the bottom portion of the second outer race member or distance by which the second ball is movable toward the end portion of the second race groove
e distance between the end surface of the second inner race member on the first end portion side of the first shaft member and the second female spline or distance between the end surface of the first inner race member on the opposite side from the one end portion of the second shaft member and the first female spline
f distance between the end surface of the second end portion of the first shaft member and the second inner race member circlip or distance between the end surface of the one end portion of the second shaft member and the first inner race member circlip
i distance by which the end surface of the one end portion of the second shaft member protrudes beyond the end surface of the first cage on the vehicle rear side or distance by which the end surface of the second end portion of the first shaft member protrudes beyond the end surface of the second cage on the vehicle rear side
P rotational axis
R radius of the end portion of the first race groove or the end portion of the second race groove
r radius of the first ball or the second ball

The invention claimed is:

1. A propeller shaft for use in an automobile, the propeller shaft comprising:
a first shaft member including a first end portion and a second end portion that are both end portions in a direction of a rotational axis of the first shaft member;
a first constant-velocity joint including a first inner race member with a first female spline provided thereon, a first ball disposed on an outer periphery of the first inner race member in a radial direction with respect to the rotational axis, a first cage configured to hold the first ball on the first inner race member, and a first outer race member disposed on an outer periphery of the first ball in the radial direction, the first outer race member including a first race groove in which the first ball is movable in the direction of the rotational axis and being connected to the first end portion of the first shaft member;
a second constant-velocity joint including a second inner race member including a second female spline provided thereon to which the second end portion of the first shaft member is splined, a second ball disposed on an outer periphery of the second inner race member in the radial direction with respect to the rotational axis, a second cage configured to hold the second ball on the second inner race member, and a second outer race member disposed on an outer periphery of the second ball in the radial direction and including a second race groove in which the second ball is movable in the direction of the rotational axis; and
a second shaft member supported on a centering bearing support fixed to the automobile and including one end portion splined to the first female spline,
wherein a distance by which the second ball is movable toward an edge portion of the second race groove is longer than a distance by which a bottom portion of the first outer race member is movable toward the first end portion of the first shaft member when the first shaft member is moved from the second end portion toward the first end portion in the direction of the rotational axis, and
a distance by which the first ball is movable toward an edge portion of the first race groove is longer than a distance by which the second end portion is movable toward a bottom portion of the second outer race member when the first shaft member is moved from the first end portion toward the second end portion.

2. The propeller shaft according to claim 1, wherein an end surface of the one end portion of the second shaft member protrudes beyond an end surface of one end portion of the first cage in the direction of the rotational axis of the first shaft member that extends from the second end portion toward the first end portion, or
an end surface of the second end portion of the first shaft member protrudes beyond an end surface of one end portion of the second cage in the direction of the rotational axis of the first shaft member that extends from the first end portion toward the second end portion.

3. The propeller shaft according to claim 1, wherein the bottom portion of the first outer race member is formed into a shape protruding in the direction of the rotational axis of the first shaft member that extends from the second end portion toward the first end portion, or the bottom portion of the second outer race member is formed into a shape protruding in the direction of the rotational axis of the first shaft member that extends from the second end portion toward the first end portion.

4. The propeller shaft according to claim 1, wherein an end surface of the bottom portion of the first outer race member or the one end portion of the second shaft member, or an end surface of the bottom portion of the second outer race member or the second end portion of the first shaft member has an R-like shape.

5. The propeller shaft according to claim 1, further comprising a grease sealing cover wherein the grease sealing cover provided in a through-hole of the bottom portion of the first outer race member is formed so as to have strength not causing deformation or breakage when the cover contacts an end surface of the one end portion of the second shaft member, or the grease sealing cover provided in a through-hole of the bottom portion of the second outer race member is formed so as to have strength not causing deformation or breakage when the cover contacts an end surface of the second end portion of the first shaft member.

6. The propeller shaft according to claim 1, wherein the movement of the first ball is restricted at an end portion of the first race groove when the first shaft member is moved from the first end portion toward the second end portion in the direction of the rotational axis, or the movement of the second ball is restricted at an end portion of the second race groove when the first shaft member is moved from the first end portion toward the second end portion in the direction of the rotational axis.

7. The propeller shaft according to claim 6, wherein a radius of the end portion of the first race groove of the first outer race member is larger than a radius of the first ball, or a radius of the end portion of the second race groove of the second outer race member is larger than a radius of the second ball.

8. The propeller shaft according to claim 1, wherein the first shaft member includes a first male spline formed on an outer peripheral surface of the second end portion of the first shaft member in the direction of the rotational axis of the first shaft member and configured to be meshed with the second female spline of the second inner race member, and a second inner race member circlip disposed between the second female spline of the second inner race member and the first male spline in the radial direction with respect to the rotational axis of the first shaft member, and a distance between an end surface of the first shaft member on a second end portion side and the second inner race member circlip is longer than a distance between an end surface of the second inner race member on a first end portion side of the first shaft member and the second female spline, or the second shaft member includes a second male spline formed on an outer peripheral surface of the one end portion of the second shaft member in a direction of a rotational axis of the second shaft member and configured to be meshed with the first female spline of the first inner race member, and a first inner race member circlip disposed between the first female spline of the first inner race member and the second male spline in a radial direction with respect to the rotational axis of the second shaft member, and a distance between an end surface of the second shaft member on a one end portion side and the first inner race member circlip is longer than a distance between an end surface of the first inner race member on an opposite side from the one end portion of the second shaft member and the first female spline.

* * * * *